April 7, 1931.　　　B. M. SHIPLEY　　　1,799,329

CASH REGISTER

Original Filed March 17, 1924　　2 Sheets-Sheet 1

Inventor
Bernis M. Shipley
By Pearl Beust
Henry E Stauffer
His Attorneys

April 7, 1931.  B. M. SHIPLEY  1,799,329
CASH REGISTER
Original Filed March 17, 1924   2 Sheets-Sheet 2
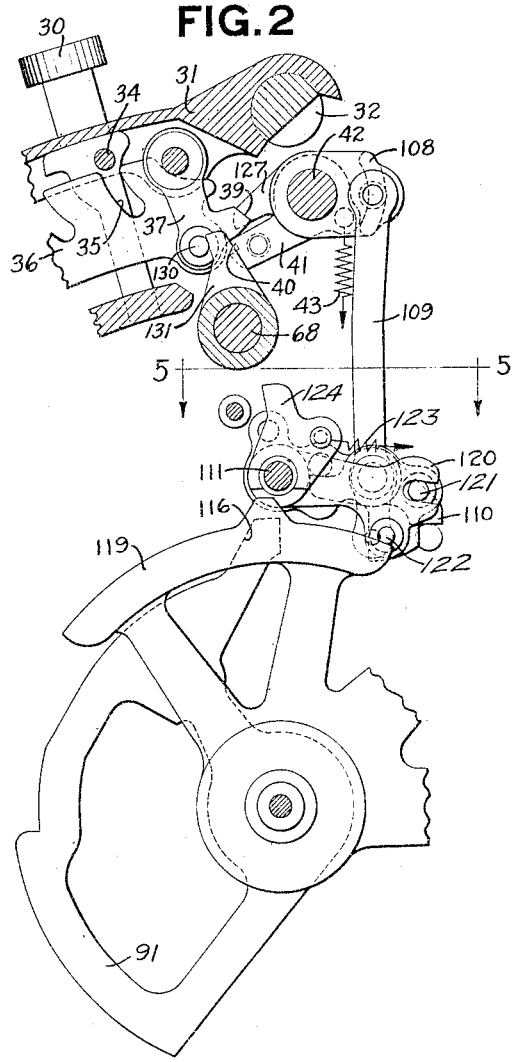
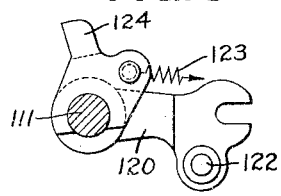
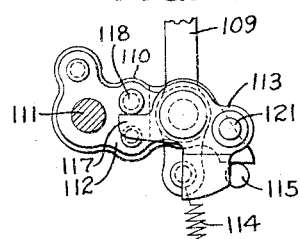
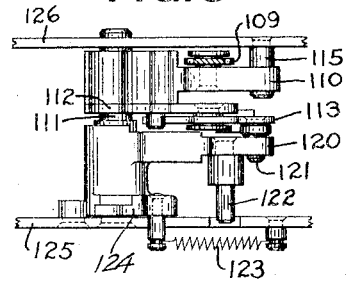
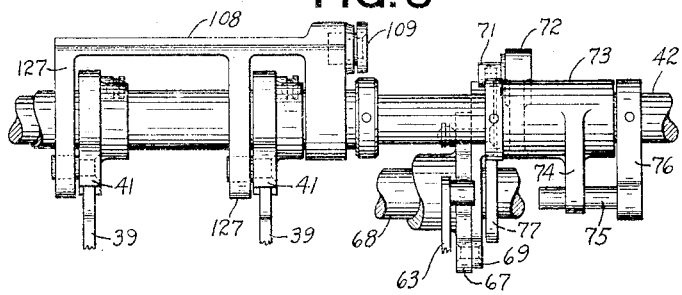
Inventor
Bernis M. Shipley
By Carl Beust
Henry Stauffer
His Attorneys Patented Apr. 7, 1931

1,799,329

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Original application filed March 17, 1924, Serial No. 699,919. Divided and this application filed January 10, 1927. Serial No. 160,097.

This invention relates to cash registers and is a division of a copending application, Serial No. 699,919, filed March 17, 1924. The invention consists of improvements in the cash register shown and described in United States Letters Patent, No. 1,626,880, issued May 3, 1927 to the present inventor.

One object of this invention is to provide means for retaining certain keys in their depressed positions during a plurality of operations.

Another object is to release said keys automatically under the control of a certain other key.

With these and incidental objects in view the invention consists in certain novel features of construction and combinations of parts, the essential elements of which are set forth in the appended claims, and a preferred form or embodiment of which is hereinafter described with reference to the drawings which accompany and form part of the specification.

Of said drawings:

Fig. 2 is a detail side elevation of the mechanism for controlling the releasing of the keys of the state banks.

Fig. 3 is a detail view of a portion of the state key release mechanism.

Fig. 4 is a section through the state key releasing mechanism.

Fig. 5 is a top view of the mechanism shown in Figs. 3 and 4, taken on line 5—5 of Fig. 2.

Fig. 6 is a top plan view of a part of the machine and state key releasing mechanism.

General statement

Figure 1:
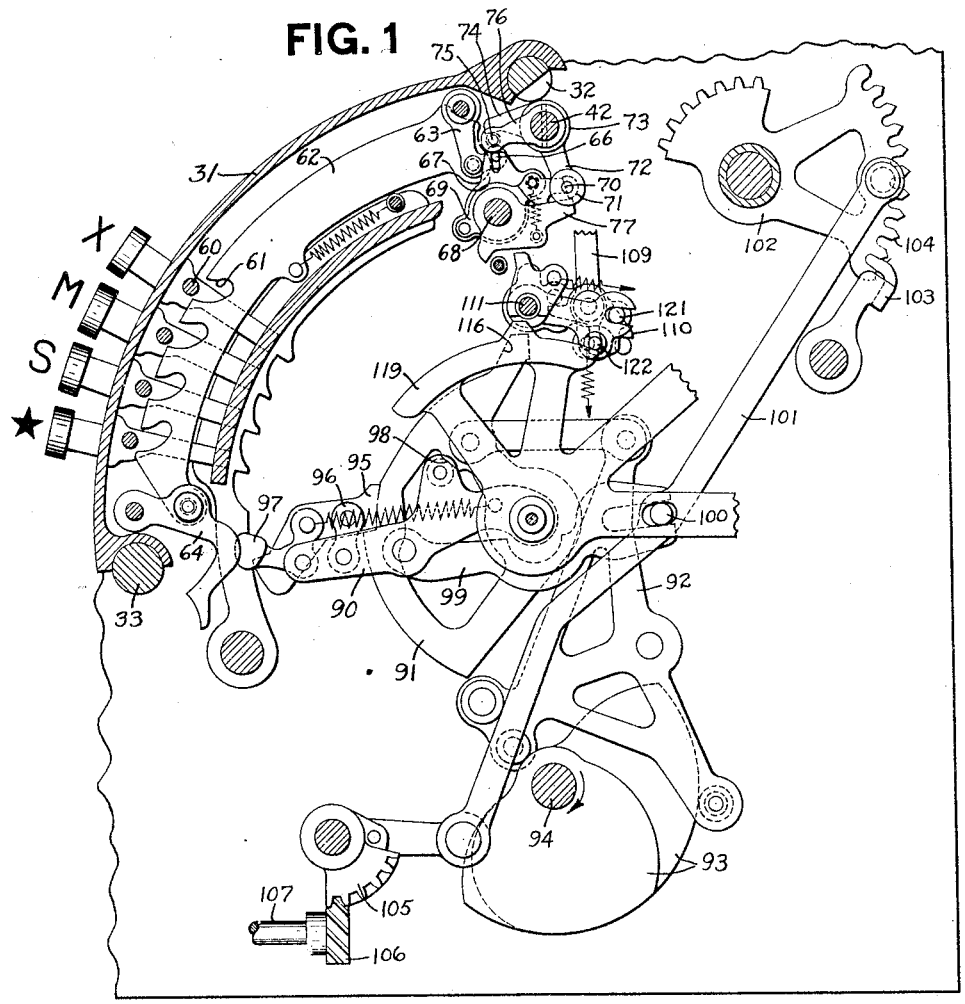
Fig. 1 is a section through the machine taken just to the right of the release bank.

This invention is shown applied to a machine specially designed for use in a large mail order establishment. While the preferred form of the invention is applied to such a machine, it would be useful in connection with any machine of this general type, and it is not intended to limit its usage to the particular machine shown.

In mail order institutions, such as the one for which the present machine was invented, a large number of orders for various kinds of merchandise is received daily. It is desirable to segregate the business received from each state and this is done by providing a plurality of totalizers, one for each state, and a key on the keyboard for selecting the proper totalizer. The machine is adapted to accumulate a total of all the business entered, in addition to a total of the business from each state. Some of the orders are for a plurality of articles and this machine will print each item, add the items and print the total thereof.

It is believed to be unnecessary to give any further description herein of the general usage of this machine, as it is very fully described in the Patent No. 1,626,880, above referred to.

Keyboard

This machine is provided with a plurality of banks of amount keys for entering amounts of money. These keys are not shown or described herein, as they form no part of the present invention, as can be seen in the Patent No. 1,626,880, above referred to.

There are two banks of keys 30, (Fig. 2) which will be known herein as "state" keys. Only one key 30 is shown and it is thought that this illustration is sufficient, inasmuch as the construction is old and well known in the art and is shown in detail in the above mentioned Patent, No. 1,626,880. Each of the state keys controls the selection of its corresponding totalizer as well as printing and indicating mechanism in a well known manner, as shown respectively in the patents to Fuller 1,242,170, granted October 9, 1917, and 1,163,748, granted December 14, 1915. The two banks of "state" keys are identical, and therefore it is thought that a description of one of these banks will be sufficient for both. The keys 30 are slidably mounted in a key frame 31, supported at its upper end on a rod 32 (Figs. 1 and 2) and at its lower end on a rod 33 (Fig. 1), which rods are mounted in the machine side frames. The keys are held in their normal undepressed positions by means of springs not shown herein, but well known in machines of this type. Each of the keys 30 carries a pin 34, adapted to cooperate with a curved slot 35, formed in a detent 36, which at its upper end is pivotally connected to a link 37, and at its lower end to a link not shown. When a key is depressed in either of the two state banks, it is evident that the detent 36 will be moved downwardly (Fig. 2) until the nose 39 on the link 37 moves over a notch 40 cut in an arm 41, loosely mounted on a shaft 42.

The arm 41 tends to rock constantly in a clockwise direction, due to a spring 43, attached thereto. When a key 30 is depressed and the nose 39 is moved away from the top of arm 41, the notch 40 engages the nose 39 and holds the detent 36 in its lowest position and the depressed key will therefore be held in such position. The means for releasing the state keys at the proper time will be hereinafter described.

An interlock is provided between the two state key banks so that a key in only one of these banks can be depressed for the same operation of the machine. This interlock forms no part of the present invention, and therefore it is not shown or described herein.

Release bank

The release keys are located in the last bank to the right. It is necessary to depress one of the keys in this bank on every operation of the machine, in order to release the machine, which is normally locked. The uppermost one of the release keys (Fig. 1) is designated the "X" key. This key is used release the machine whenever an order is entered which consists only of a single item and also when it is desired to print the total of a plurality of items of a single order. Next, below the "X" key, is the "M" key, which is used only to release the machine when entering the individual items of a multiple item transaction or mixed order. Below the "M" key is the "S" key, which is used when taking totals of the business accummulated on any state totalizer. The lowest key in this bank is known as the "black star" key, and it is used only when it is desired to take a grand total of all the items entered in a group of the state totalizers. The release keys are slidably mounted in a key frame 31, which is identical with the key frame 31 for the state keys above described. It is not believed that any further description of this mechanism need be given here.

The total lever is located to the right of the state bank, and is of a well known construction in this type of machine, and therefore, no description is included in this application. This total lever is illustrated and described in the above mentioned Patent, No. 1,626,880.

Release mechanism

As above mentioned, this machine is normally locked, and it is necessary to depress one of the keys in the release bank in order to unlock the machine for operation. Each of the release keys carries a pin 60 (Fig. 1), projecting laterally from its shank, adapted to cooperate with a curved slot 61, formed in release bar 62, supported at its upper end by a link 63 pivoted on the key frame, and at its lower end by a link 64. The link 63 (Figs. 1 and 6) has a rearwardly projecting portion which carries a pin 66 cooperating with a bifurcated arm 67, which is loosely mounted on a shaft 68. This arm 67 has attached thereto a release pawl 69, which has a nose 70 normally contacting a flattened stud 71, carried by an arm 72, mounted on a hub 73, loose on the release shaft 42. The hub 73 also carries a projecting arm 74, which contacts a stud 75, carried by an arm 76 fast on the release shaft 42. As described in the above mentioned Patent, No. 1,626,880, this shaft 42 is normally under spring tension and tends to rock in a clockwise direction (Fig. 1) for the purpose of closing the motor circuit, and thus operating the machine. It is apparent, however, that when the nose 70 of the release pawl 69 is in contact with the flattened stud 71 on arm 72, this arm, and therefore the arm 74, will be held against movement. As the stud 75 on the arm 76 contacts the arm 74, it is evident that this arm, and therefore the release shaft 42, will be prevented from moving to their releasing positions.

When, however, a release key is depressed and the release bar 62 moved downwardly, the pin 66 will rock the member 67 and the release pawl 69, in a counter-clockwise direction, and move the nose 70 away from the stud 71. The arm 72 and arm 76 are thereby permitted to rock clockwise under the influence of a spring (not shown) to release the machine. Also loose on the shaft 68 adjacent the release pawl 69 is what is known in the art as a "non-repeat pawl" 77. The object of this pawl is to prevent an immediate second operation of the machine should the operator maintain the release key depressed at the end of an operation, as is fully described in the patent to Fuller No. 1,242,170, above referred to.

Differential mechanism

Cooperating with each of the banks of state keys and with the release bank, is a differentially movable arm 90 (Fig. 1). Each arm 90 is driven in a clockwise direction by a segment 91, which is given a constant excursion during every operation by means of a Y-shaped lever 92, driven by a pair of cams 93, fast on the main drive shaft 94. The differentially movable arm is latched to the driving segment on its clockwise movement by a latch 95, carried by a link 96 and a bell crank lever 97, both supported by said differentially movable arm. The arm 90 is disconnected from the driving segment 91 when the bell crank lever 97 comes into contact with the inner end of the depressed key. The differentially movable arm is returned to its home position during the latter part of every operation of the machine by the engagement of a surface 98 on the driving segment 91, with a pin on the arm 90.

Pivoted to the arm 90 is a beam 99, which at its opposite end is bifurcated and straddles a pin 100, carried by a link 101. At its upper end this link is pivoted to an indicator setting segment 102, which is thereby set in accordance with the position of the differentially movable arm in a well known manner. An aligner 103 is provided, which co-operates with the aligning teeth 104 of said indicator setting segment.

At its lower end the link 101 is connected to a spiral segment 105, which meshes with a spiral gear 106 fast on a shaft 107, which in turn, through a well known connection, sets up the proper figures or letters on an appropriate type wheel.

*Mechanism for releasing state keys*

As before noted, many of the orders which are received, call for a plurality of items, and in order to save the operator's time and prevent the possibility of mistakes, mechanism is provided for holding the depressed "state" key in depressed position during a plurality of operations until the total of the items making up the order is taken, whereupon it will be released automatically and permitted to return to its normal, undepressed position.

It has been described above how the state keys are locked in their depressed positions. The mechanism for releasing the state keys will now be described. The arms 41 for the state key banks are operated by means of a yoke 108 (Figs. 2 and 6) loosely mounted on the release shaft 42. Pivoted to the right-hand end of this yoke is a downwardly extending link 109 (Figs. 2, 4, 5 and 6) which at its lower end is pivoted to an arm 110. This arm is loosely mounted on a rod 111 and has fastened thereto an arm 112 upon which is pivoted a pawl 113. The arm 110 normally tends to rock in a clockwise direction, due to a spring 114 (Fig. 4), which is connected to the lower end of the link 109. This movement, however, is limited by the engagement of the right hand end of the arm 110 with a stationary pin 115.

This mechanism is in the plane of the differential mechanism for the release bank and the driving segment 91 for this bank has a finger 116 (Figs. 1 and 2), which, when the segment 91 is given a clockwise movement, as before described, will come into contact with the pawl 113 and will rock this pawl counter-clockwise (Fig. 4) about its pivot, until the finger passes the pawl, whereupon the pawl returns to the position shown in Fig. 4, in which position it is stopped by the engagement of a nose 117 on the pawl, with a pin 118 on the arm 112. Then upon the return or counter-clockwise movement of the segment 91, the finger 116 thereof will strike the lowest curved edge of the pawl 113 and thereby raise the pawl and the arms 110 and 112. This will in turn rock the yoke 108 counter-clockwise. The yoke carries two arms 127 (Figs. 2 and 6) which are adapted to cooperate with the arms 41, so that when the yoke is rocked, the arms 41 will be disengaged from the noses 39. The detent 36 can then move upwardly until it is arrested by the engagement of a stud 130, (Fig. 2), carried by the link 37, with an arm 131 sleeved to the arm 67. Near the end of the operation of the machine the pawl 69 and arm 67 are returned to their normal positions whereupon the arm 131 is rocked clockwise (Fig. 2), thereby permitting the detent 36 to continue its upward movement to permit the depressed keys to return to their undepressed positions. The arm 131 and its connection to the release pawl 69 is shown and described in the patent to Shipley No. 1,619,796 and therefore no further reference will be made thereto.

This operation, as just described, takes place whenever the machine is operated with any one of the state keys depressed, and with any of the release keys depressed, except the "M" key. It will be remembered that the "M" key is used when entering the items of a mixed order. So long as items are being entered and the key is being depressed, it is not desired to have the "state" key released, and therefore mechanism is provided to disable the state key releasing mechanism whenever the "M" key is depressed, and this mechanism includes the following.

Pivotally mounted on the same center as the driving segment 91 for the release bank is a segmental cam 119 (Figs. 1 and 2) which has a node appropriate to the "M" key. As shown in Fig. 1, the segmental cam 119 is connected to the differential mechanism through the pin 100, previously described, which extends laterally through a slot in an arm rigid with said cam. It is evident, therefore, that the cam 119 will be differentially positioned in accordance with the key depressed in the release bank.

Loosely mounted on the rod 111 is the lever 120 (Figs. 2, 3 and 5) bifurcated to embrace a stud 121, carried by the pivoted pawl 113. (See also Fig. 4.) The lever 120 also carries a stud 122 which contacts the periphery of the segmental cam 119. The pin 122 on the lever 120 is normally held in contact with the segmental cam by means of a spring 123 stretched between a pin carried by an arm 124 of the lever 120 and a pin carried by a frame 125 (Fig. 5), which together with a similar frame 126 supports this mechanism.

If the "M" key is depressed in the release bank, the segmental cam 119 will be adjusted by the differential, to a position whereby the node of the cam will raise the pin 122 and rock the lever 120 counter-clockwise (Fig. 2). This movement of the lever 120 rocks the pawl 113 counter-clockwise. Then, when the driving segment 91 is given its clockwise and then its counter-clockwise movement, the finger 116 thereof will not come into contact with the pawl 113, and therefore the arms 110 and 112 will not be rocked counter-clockwise. The link 109, yoke 108, arms 127 and 41 will, therefore, remain in the positions which they assumed upon the depression of a state key, and the key will not be released.

Upon depression of the "X" key, when taking the total of the mixed order, the cam 119 assumes a different position, wherein the node of said cam does not contact the pin 122 and the state key will be released at the end of such an operation.

Operation

A brief description of the operation of the machine will now be given. If an order containing a single item is to be entered into the machine, the order upon which the amounts are listed is placed upon the printing table, then the keys representing the amount of the items and the state are depressed, and then the machine is released by depression of the "X" key. Upon operation of the machine, the amount is added in the appropriate totalizer and also is printed upon the order, and both the amount and state keys are released at the end of the operation.

If an order is to be entered which is known as a mixed order, that is one containing a number of items, the items of the order are set up on the keyboard consecutively; that is, the amount of the first item is set up on the keyboard and the state key depressed, and the machine is released by depression of the "M" key. Then upon operation of the machine, the amount keys are released, but the state keys remain depressed.

After all of the items have thus been entered, the machine is adjusted for total printing, to select the proper totalizer, and then the machine is released by depression of the "X" key. Upon operation of the machine the total will be printed upon the order sheet, and at the end of the operation all of the keys, including the state key, will be released. Thus it is seen that in entering multiple item transactions, it is only necessary to depress the state key once, that is, during the entry of the first item, and this key will remain depressed until after the total has been printed and the machine is released by depression of the "X" key.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a cash register, the combination of a bank of keys, a latch for holding said keys in depressed position, a link cooperating with said latch, an arm secured to said link, a pawl pivoted on said arm and having an initial pivotal movement in one direction only, and a member having an invariable oscillatory movement and adapted to rock said pawl about its pivot during its movement in one direction and upon its return movement adapted to rock said pawl and arm as a unit for the purpose of moving said link and latch to release the depressed key.

2. In a cash register, the combination of a bank of keys, a latch for holding said keys in depressed position when depressed, a link cooperating with said latch, an arm secured to said link, a pawl pivoted on said arm and having an initial pivotal movement in one direction only, a member having an invariable oscillatory movement and adapted to rock said pawl about its pivot during its movement in one direction and adapted to rock said pawl and said arm as a unit on its return movement for the purpose of moving said link and latch to release the depressed key, and means for moving said pawl out of the path of said oscillatory member to prevent the release of said depressed key.

3. In a cash register, the combination of a bank of keys, a latch for holding said keys in depressed position when depressed, a link cooperating with said latch, an arm secured to said link, a pawl pivoted on said arm and having an initial pivotal movement in one direction only, a member having an invariable oscillatory movement and adapted to rock said pawl about its pivot during its movement in one direction and adapted to rock said pawl and said arm as a unit on its return movement for the purpose of moving said link and latch to release the depressed key, and a differentially movable member for moving said pawl out of the path of said oscillatory member to prevent the release of said depressed key.

4. In a cash register, the combination of a bank of keys, a latch for holding said keys in depressed position when depressed, a link cooperating with said latch, an arm secured to said link, a pawl pivoted on said arm and having an initial pivotal movement in one direction only, a member having an invariable oscillatory movement and adapted to rock said pawl about its pivot during its movement in one direction and adapted to rock said pawl and said arm as a unit on its return movement for the purpose of moving said link and latch to release the depressed key, a pin mounted on said pawl, a lever having a bifurcated portion engaging said pin, another pin carried by said lever, and a differentially movable member cooperating with said last mentioned pin and having a raised portion for moving said pawl to an ineffective position with relation to said oscillatory member in order to prevent the release of the depressed key.

5. In a machine of the class described, the combination of a plurality of depressible keys, releasing means for the keys, a differential driving member, adapted to operate the releasing means, and a differentially movable member driven by the driving member and adapted to disable the releasing control of the driving member.

6. In a machine of the class described, the combination of a differentially movable member, a driving member therefor, a releasing mechanism including an adjustable pawl normally in the path of the driving member, and adapted to be operated by said driving member, and means on said differentially movable member for adjusting said pawl out of the path of said driving member.

7. In a machine of the class described, the combination of a plurality of banks of keys, releasing means associated with each bank, a differentially movable member controlled by the keys of one bank, a driver for said differential member, and adapted to operate the releasing means for the other bank, and means on said member for disabling the release control of said driver when a predetermined key in said one bank is operated.

8. In a machine of the class described, the combination of a plurality of banks of keys, releasing means for each bank, a differentially movable member adjusted under control of one of said banks of keys, and means controlled by the differentially movable member to determine whether or not the releasing means for the other bank shall operate during a single machine operation.

In testimony whereof I affix my signature.

BERNIS M. SHIPLEY.